(12) United States Patent
Fang et al.

(10) Patent No.: US 11,195,111 B2
(45) Date of Patent: Dec. 7, 2021

(54) METHOD AND DEVICE FOR PREDICTING BOX OFFICE TREND OF FILM, AND STORAGE MEDIUM

(71) Applicant: BAIDU INTERNATIONAL TECHNOLOGY (SHENZHEN) CO., LTD., Shenzhen (CN)

(72) Inventors: Xiaomin Fang, Shenzhen (CN); Zeheng Wu, Shenzhen (CN); Fan Wang, Shenzhen (CN); Jingzhou He, Shenzhen (CN)

(73) Assignee: BAIDU INTERNATIONAL TECHNOLOGY (SHENZHEN) CO., LTD., Shenzhen (CN)

( * ) Notice: Subject to any disclaimer, the term of this patent is extended or adjusted under 35 U.S.C. 154(b) by 890 days.

(21) Appl. No.: 15/969,554

(22) Filed: May 2, 2018

(65) Prior Publication Data

US 2018/0330256 A1 Nov. 15, 2018

(30) Foreign Application Priority Data

May 12, 2017 (CN) .......................... 201710334327.6

(51) Int. Cl.
*G06N 20/00* (2019.01)
*G06N 5/04* (2006.01)
(Continued)

(52) U.S. Cl.
CPC ............. *G06N 5/048* (2013.01); *G06F 17/18* (2013.01); *G06N 20/00* (2019.01); *G06Q 30/0202* (2013.01)

(58) Field of Classification Search
None
See application file for complete search history.

(56) References Cited

U.S. PATENT DOCUMENTS

| 2013/0204664 A1* | 8/2013 | Romagnolo | ....... G06Q 30/0203 705/7.32 |
| 2013/0311408 A1* | 11/2013 | Bagga | .................... G06N 20/00 706/12 |
| 2015/0170296 A1* | 6/2015 | Kautz | .................... G06Q 10/00 705/319 |

FOREIGN PATENT DOCUMENTS

| CN | 1421808 | 6/2003 |
| CN | 106355499 | 1/2017 |

OTHER PUBLICATIONS

Escobar et al., Dynamical Signatures of Collective Quality Grading in a Social Activity: Attendance to Motion Pictures, PLOSone, pp. 1-15 (Year: 2015).*

(Continued)

*Primary Examiner* — David R Vincent
(74) *Attorney, Agent, or Firm* — Hodgson Russ LLP

(57) ABSTRACT

Embodiments of the present disclosure provide a method and a device for predicting a box office trend of a film, a device and a storage medium. The method includes acquiring in real time a plurality of dynamic factor data of each of various films to be shown, in which, the dynamic factor data represents a factor that influences box office of the film; after a film in the various films is shown, incrementally updating a pre-trained box office prediction model by using box office data and the plurality of dynamic factor data of the film; and according to a preset period, predicting a box office trend of a target film to be predicted in the various films by using a box office prediction model incrementally updated in each preset period and the plurality of dynamic factor data of the target film, to obtain a plurality of prediction results.

12 Claims, 6 Drawing Sheets

(51) Int. Cl.
 G06Q 30/02 (2012.01)
 G06F 17/18 (2006.01)

(56) References Cited

OTHER PUBLICATIONS

Moon et al., Predicting the Near-Weekend Ticket Sales Using Web-based External Factors and Box-office Data, 2014, IEEE pp. 1-7 (Year: 2014).*
SIPO, First Office Action for CN Application No. 201710334327.6, dated Jun. 6, 2019.
SIPO, Second Office Action for CN Application No. 201710334327.6, dated Nov. 28, 2019.
SIPO, Third Office Action for CN Application No. 201710334327.6, dated Jun. 30, 2020.
Xiao et al., "A Multi-factor Dynamic Coarse Prediction Model of Tourism Demand," Statistics and Decision-Making, Jun. 2005, pp. 33-34.

* cited by examiner

METHOD AND DEVICE FOR PREDICTING BOX OFFICE TREND OF FILM, AND STORAGE MEDIUM

CROSS REFERENCE TO RELATED APPLICATION

This application is based upon and claims priority to Chinese Patent Application Serial No. 201710334327.6, filed with the Status Intellectual Property Office of P. R. China on May 12, 2017, the entire contents of which are incorporated herein by reference.

FIELD

Embodiments of the present disclosure relate to a computer technology field, and more particularly to a method and a device for predicting a box office trend of a film and a storage medium.

BACKGROUND

At present, China's film market is booming, and in the future, China's film box office is likely to surpass that of the United States, and China would become the largest film country. The prediction of the box office of the film can provide a reference to a series of acts such as film investing, operating, promoting, pricing for advertisements etc., and also provide a reference to film row rate in theaters etc. Therefore, it is of great significance to predict the box office of film accurately.

In the related art, the method for predicting the box office of the film usually uses a simple linear regression model to train fitting of data sets, which is equivalent to automatically learning weights of features, or predicting by a classification model, for example, for the box office, there can be many different intervals such as less than 10 million, 10 to 100 million, 100 million to 500 million, or more than 500 million, and then as a classification task, the box office of the film is classified into a corresponding interval.

However, in the related art, only daily box office or weekly box office of the film is predicted at once a little ahead of time, for example, the box office of the film on one day is predicted at 9 a.m. on that day. The prediction has limited values for activities such as making operation decisions, determining film row rate or pricing for advertisements, and due to the restriction of training data, accuracy and correctness of prediction models and prediction results may be affected.

SUMMARY

Embodiments of the present disclosure provide a method and a device for predicting a box office trend of a film, a device and a storage medium.

According to a first aspect, embodiments of the present disclosure provide a method for predicting a box office trend of a film. The method includes acquiring in real time a plurality of dynamic factor data of each of various films to be shown, in which, the dynamic factor data represents a factor that influences box office of a film; after a film in the various films is shown, incrementally updating a pre-trained box office prediction model by using box office data and the plurality of dynamic factor data of the film; and according to a preset period, predicting a box office trend of a target film to be predicted in the various films by using a box office prediction model incrementally updated in each preset period and the plurality of dynamic factor data of the target film, to obtain a plurality of prediction results.

According to a second aspect, embodiments of the present disclosure provide a device for predicting a box office trend of a film. The device includes a dynamic factor data acquiring module, configured to acquire in real time a plurality of dynamic factor data of each of various films to be shown, in which, the dynamic factor data represents a factor that influences box office of a film; a model incremental updating module, configured to, after a film in the various films is shown, incrementally update a pre-trained box office prediction model by using box office data and the plurality of dynamic factor data of the film; and a predicting module, configured to, according to a preset period, predict a box office trend of a target film to be predicted in the various films by using a box office prediction model incrementally updated in each preset period and the plurality of dynamic factor data of the target film, to obtain a plurality of prediction results.

According to a third aspect, embodiments of the present disclosure provide a device. The device includes one or more processors and a storage device configured to store one or more programs. When the one or more programs are executed by the one or more processors, the one or more processors are caused to implement the method for predicting a box office trend of a film described above.

According to a fourth aspect, embodiments of the present disclosure provide a computer readable storage medium having computer programs stored thereon. When the programs are executed by a processor, a method for predicting a box office trend of a film described above is implemented.

DETAILED DESCRIPTION

Reference will be made in detail to the present disclosure with reference to the accompanying drawings and the embodiments. It should be understood that, the embodiments described herein are only used to explain the present disclosure, and rather than to limit the present disclosure. In addition, it should also be noted that, for convenience of description, only some but not all structures related to the present disclosure are illustrated in the accompanying drawings.

First Embodiment

Figure 1:
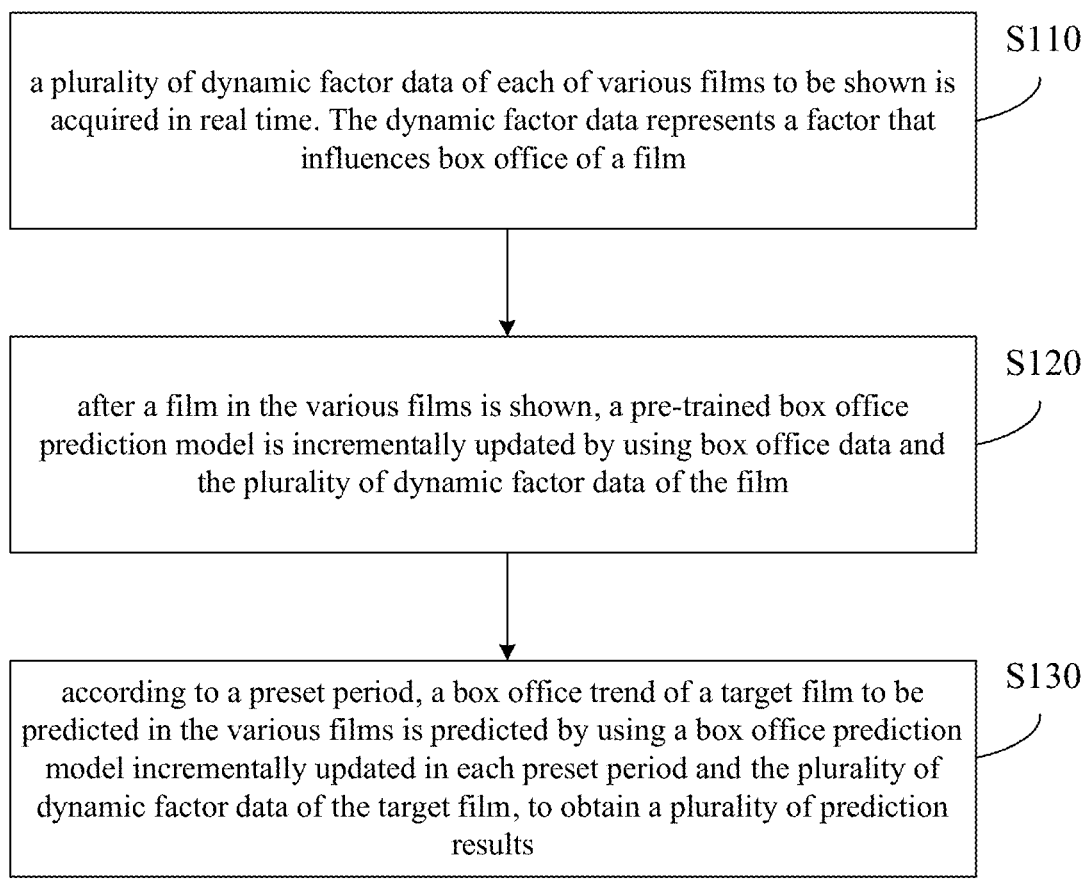
FIG. 1 is a flow chart of a method for predicting a box office trend of a film according to a first embodiment of the present disclosure.

FIG. 1 is a flow chart of a method for predicting a box office trend of a film according to a first embodiment of the present disclosure. The embodiment may be applied to a situation of predicting a box office trend of a target film to be shown. The method may be performed by a device for predicting a box office trend of a film. The device may be achieved by software and/or hardware. The method for predicting the box office trend of the film according to the first embodiment of the present disclosure includes followings.

At block S110, a plurality of dynamic factor data of each of various films to be shown is acquired in real time. The dynamic factor data represents a factor that influences box office of a film.

There are many factors affecting the box office of the film. For example, before the film is shown, the factors include promotion of investors, public's attention to the film, comments or the number of topics and the like. These factors may be dynamically changed every day, and new messages related to the film may appear every day, and the closer it is to the show time, the more information can be obtained, and the higher the confidence of the information is. Therefore, it is necessary to obtain a plurality of dynamic factor data of each of the various films to be shown before the film is shown. As an example, web crawlers can be used to obtain dynamic factor data in real time.

In an embodiment, the dynamic factor data of a film may include followings.

1) search volume, news volume, the number of micro-blog topics, the number of post bar topics and an index showing passion to see provided by each platform (nuomi, maoyan) of the film;

2) search volume, news, the number of micro-blog topics, the number of post bar topics and the number of fans of a creator (leading actor, director, etc.);

3) search volume, news volume, the number of micro-blog topics, the number of post bar topics of a film having related theme;

4) search volume, news volume, the number of micro-blog topics, the number of post bar topics of a film produced by the same production team;

5) search volume, news volume, the number of micro-blog topics, the number of post bar topics of a film in the same series as the film and related intellectual property (IP);

6) amount of play, comment number, public praise of a trailer of the film;

7) box office and public praise at abroad when the film is introduced from abroad;

8) competitiveness of films to be shown in the same time period as the film.

At block S120, after a film in the various films is shown, a pre-trained box office prediction model is incrementally updated by using box office data and the plurality of dynamic factor data of the film.

As described above, before the film is shown, various dynamic factors that affect the box office may appear every day, and the closer it is to the show time, the more information can be obtained, and the higher the confidence of the information is, i.e., contributions of these dynamic factors to the box office of the film are different. After the film is shown, the pre-trained box office prediction model can be updated by using the box office data of the film and the dynamic factor data of the film acquired in advance, so that the impact and weight of each of the dynamic factors to the box office trend of the film before the film is shown can be better learned, and the model can be trained more accurately, and the trained model can predict the box office trend long before the film is shown.

In at least one embodiment, operations at block S120 may include: acquiring in real time the box office data of the film that has been shown in the various films; training the pre-trained box office prediction model by taking the box office data and the plurality of dynamic factor data of the film that has been shown as new model training data, to obtain an updated box office prediction model; and whenever a new film in the various films is shown, retraining the updated box office prediction model by using box office data and the plurality of dynamic factor data of the new film, to obtain the box office prediction model incrementally updated.

Through the above operations, the updated model can be continuously trained and updated by using the box office data and the plurality of dynamic factor data of the films that have been shown, so that the a plurality of box office prediction models can be obtained.

It should be noted that, the pre-trained box office prediction model may be trained and obtained by fitting previous film data using a machine learning model, such as a linear regression model, a logistics regression model, a gradient boost decision tree (GBDT) model and a neural network, etc.

At block S130, according to a preset period, a box office trend of a target film to be predicted in the various films is predicted by using a box office prediction model incrementally updated in each preset period and the plurality of dynamic factor data of the target film, to obtain a plurality of prediction results.

Considering that the closer it is to the show time, the more information can be obtained, and the higher the confidence of the information is, there will be a problem of inaccurate prediction when one-time prediction is performed according to data at a certain moment. Therefore, in embodiments of the present disclosure, a prediction period can be preset, such as one day, or several days. When the preset period arrives, the box office trend is predicted by using the currently acquired dynamic factor data, such that multiple predictions can be performed to obtain the plurality of prediction results, and the box office prediction model is the currently updated model in the prediction period. Each prediction result is obtained according to the updated model and the latest acquired dynamic factor data that affect box office of the film, such that the prediction result is revised gradually.

In embodiments of the present disclosure, the pre-trained box office prediction model is incrementally updated by using the box office data and the dynamic factor data acquired in real time, the accuracy of the model is improved, and then the box office trend of the target film is predicted by using the updated box office prediction model, such that a plurality of prediction results can be obtained. Instead of predicting the box office at one time, the prediction result is constantly modified according to the real-time updated model and the newly acquired data, such that the box office trend can be predicted a long while in advance, and the accuracy and value of the prediction result can also be improved.

Second Embodiment

Figure 2:
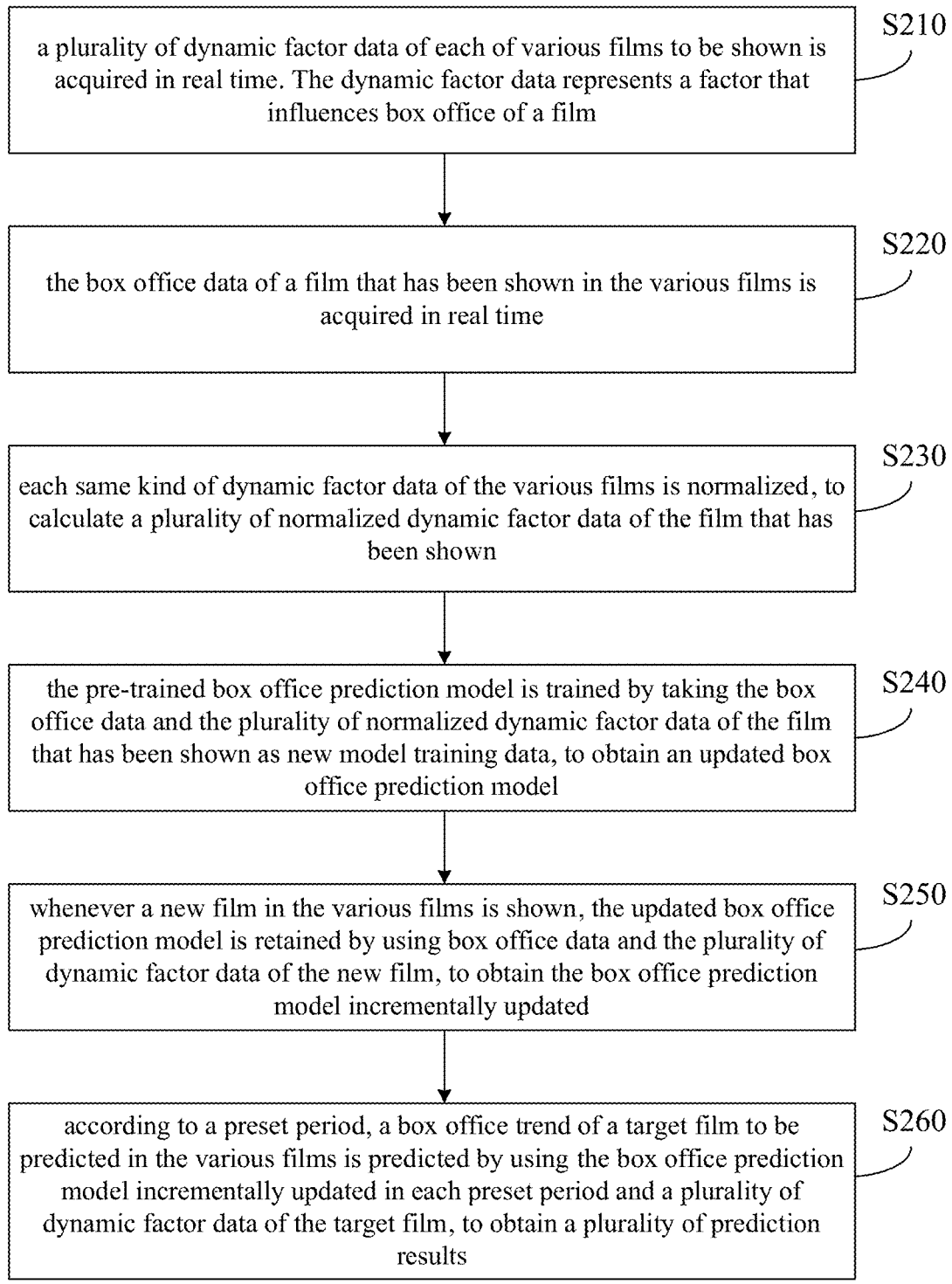
FIG. 2 is a flow chart of a method for predicting a box office trend of a film according to a second embodiment of the present disclosure.

FIG. 2 is a flow chart of a method for predicting a box office trend of a film according to a second embodiment of the present disclosure. The second embodiment further describes operations of model training and updating on the basis of the first embodiment.

As illustrated in FIG. 2, the method for predicting the box office trend of the film according to the second embodiment of the present disclosure may include followings.

At block S210, a plurality of dynamic factor data of each of various films to be shown is acquired in real time. The dynamic factor data represents a factor that influences box office of the film.

At block S220, the box office data of a film that has been shown in the various films is acquired in real time.

For example, after the film is shown, the box office data of the film can be obtained in real time through the web crawler.

At block S230, each same kind of dynamic factor data of the various films is normalized, to calculate a plurality of normalized dynamic factor data of the film that has been shown.

In detail, on the one hand, the various dynamic factors of the same film may not be comparable. For example, the search volume of the film may be hundreds of thousands of times a day, but the number of news may be only a few dozen. When these dynamic factors are directly used as a feature training model, the model may not be well fitted. On the other hand, the same kind of dynamic factors of different films may be comparable. For example, when search volume of a film A is greater than that of a film B, box office of the film A may likely to be greater than box office of the film B.

Based on the above two aspects, in embodiments of the present disclosure, a reference point is selected for each dynamic factor, and the dynamic factor of each film is normalized to a comparable range. Then, when training the model, the numerical value of each dynamic factor which is configured as the training sample can be relatively comparable, and the model can be better fitted.

At block S240, the pre-trained box office prediction model is trained by taking the box office data and the plurality of normalized dynamic factor data of the film that has been shown as new model training data, to obtain an updated box office prediction model.

At block S250, whenever a new film in the various films is shown, the updated box office prediction model is retained by using box office data and the plurality of dynamic factor data of the new film, to obtain the box office prediction model incrementally updated.

At block S260, according to a preset period, a box office trend of a target film to be predicted in the various films is predicted by using the box office prediction model incrementally updated in each preset period and a plurality of dynamic factor data of the target film, to obtain a plurality of prediction results.

In at least one embodiment, at block S230, for each dynamic factor data, the normalization can be performed as follows.

An average value and a first standard deviation of a same kind of dynamic factor data of the various films to be shown are calculated.

Each kind of the dynamic factor data of the film that has been shown minus the corresponding average value is divided by the corresponding first standard deviation, to obtain each kind of normalized dynamic factor data of the film that has been shown.

For example, the search volume of the film is taken as an example. According to the search volumes of the various films to be shown currently acquired, an average value μ and a first standard deviation α of the search volume of each film are calculated first. The average value μ can be considered as a reference point. Then, the average value μ is subtracted from the search volume of each film and the obtained difference is divided by the first standard deviation α, then normalized data of search volume of each film can be obtained. For other dynamic factor data, the normalization can be performed according to the above ways, to obtain a plurality of normalized dynamic factor data of the film, and a plurality of normalized dynamic factor data of the film that has been shown may also be obtained.

The standard deviation is also called STD. Still taking the search volume of the film as an example, assuming there is a set of values X1, X2, X3, . . . , Xn for the search volume, which are real numbers, and their average value is the standard deviation can be calculated by following formula.

$$\alpha = \sqrt{\frac{1}{N}\sum_{i=1}^{N}(xi-\mu)^2}$$

It should be noted that, in embodiments of the present disclosure, during the training process of the pre-trained box office prediction model, the plurality of the dynamic factor data may also be normalized first, and then a training is performed by taking each of the acquired normalized dynamic factor data as a training sample, to obtain the box office prediction model.

In embodiments of the present disclosure, during the process of incrementally updating the box office prediction model, the dynamic factor data is normalized and then used as sample data for training the model. The normalized dynamic factor data is comparable, so that the relationship between different films is taken into account in the process of training the model, the effect of model fitting is enhanced, and the accuracy and value of the prediction result are improved.

Third Embodiment

Figure 3:
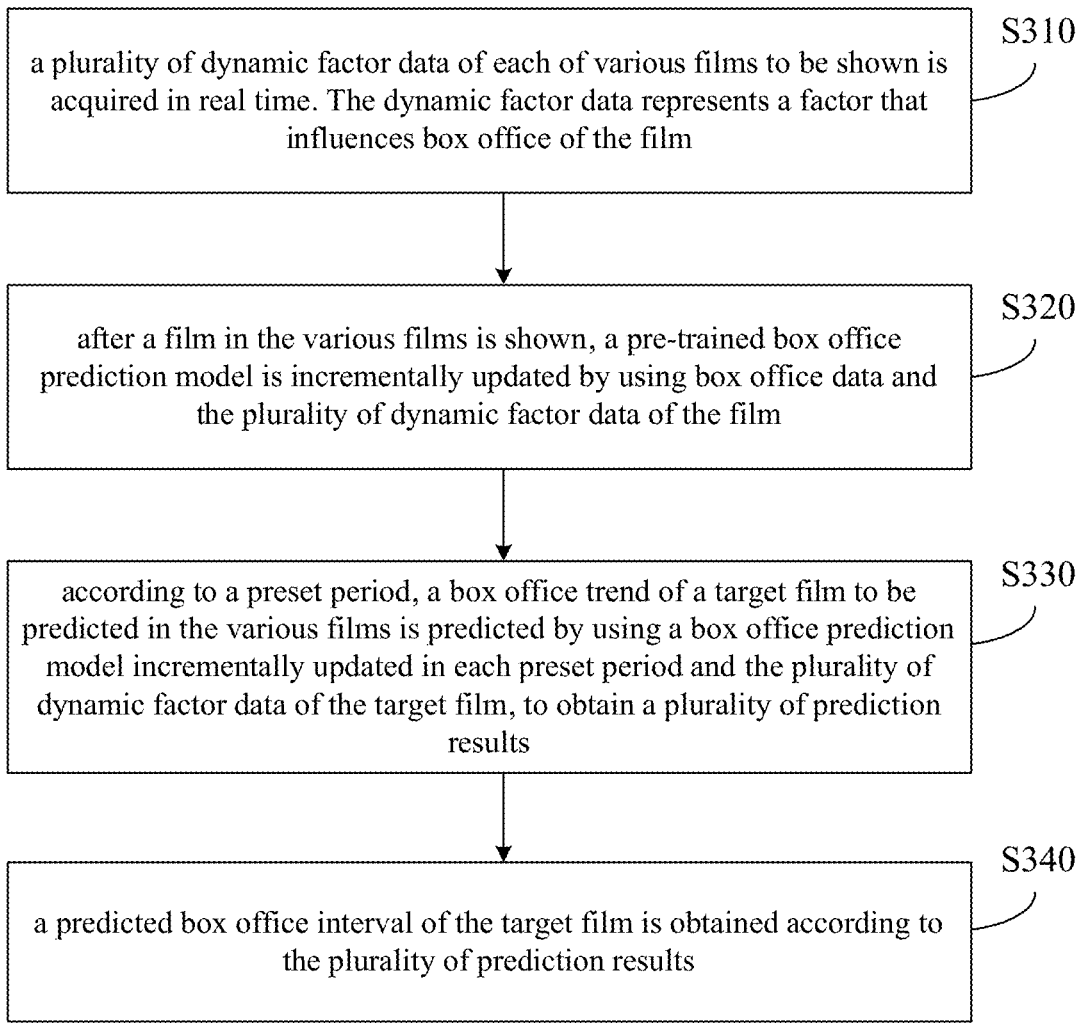
FIG. 3 is a flow chart of a method for predicting a box office trend of a film according to a third embodiment of the present disclosure.

FIG. 3 is a flow chart of a method for predicting a box office trend of a film according to a third embodiment of the present disclosure. The third embodiment is optimized on the basis of the above embodiments.

As illustrated in FIG. 3, the method for predicting the box office trend of the film according to the third embodiment of the present disclosure may include followings.

At block S310, a plurality of dynamic factor data of each of various films to be shown is acquired in real time. The dynamic factor data represents a factor that influences box office of the film.

At block S320, after a film in the various films to be shown is shown, a pre-trained box office prediction model is incrementally updated by using box office data and the plurality of dynamic factor data of the film.

At block S330, according to a preset period, a box office trend of a target film to be predicted in the various films is predicted by using a box office prediction model incrementally updated in each preset period and the plurality of dynamic factor data of the target film, to obtain a plurality of prediction results.

At block S340, a predicted box office interval of the target film is obtained according to the plurality of prediction results.

In embodiments of the present disclosure, not only the prediction results may be obtained after multiple times of predictions, but also the predicted box office interval can be calculated according to the prediction results, and the predicted box office interval has higher reference value and significance for film investors.

In detail, according to a statistical principle, the predicted box office of the target film can be calculated according to the plurality of prediction results.

In an embodiment, the predicted box office interval of the target film can be calculated by: calculating a second standard deviation of the plurality of prediction results, and calculating a product value of the second standard deviation and a preset confidence coefficient; and determining the predicted box office interval as a prediction result obtained in a preset period minus the product value to the prediction result obtained in the preset period plus the product value.

In detail, when the same film is predicted every day, then there will be n prediction results after n days. Assuming that the prediction result on the ith day is $\beta i$, a second standard deviation $\sigma$ of prediction results from $\beta 1$ to $\beta n$ is calculated first, and then a product value $k\sigma$ of the second standard deviation $\sigma$ and a preset confidence coefficient k is calculated. Then, it is determined that the predicted box office interval is $[\beta n-k\sigma, \beta n+k\sigma]$, in which, k controls a length of the interval, and can be set in advance based on experience. In other words, a final real box office will fall into the above interval with high probability. And, under normal circumstances, when no big unexpected event occurs, for a film, as time goes on, the higher the confidence of the obtained information is, the more accurate the prediction result of the model is, i.e., it is highly possible that an accuracy rate of $\beta n$ is greater than that of $\beta i$ (i<n). As the number of the prediction results increases, it is highly possible that the standard deviation $\sigma$ of the prediction results will be smaller and smaller, the range of the interval will be smaller and smaller, and its accuracy and reference value may be increased accordingly.

The calculation formula of the second standard deviation $\sigma$ of the prediction results may be expressed as:

$$\sigma = \sqrt{\frac{1}{N}\sum_{i=1}^{N}(\beta i - \mu)^2}$$

$\beta i$ is the prediction result on the ith day, and $\mu$ is the arithmetic mean value of $\beta 1$ to $\beta n$.

In embodiments of the present disclosure, not only a predicted value of the box office can be obtained, but also the predicted box office interval can be calculated according to a plurality of prediction results, thereby increasing the accuracy and value of the prediction result.

Fourth Embodiment

Figure 4:
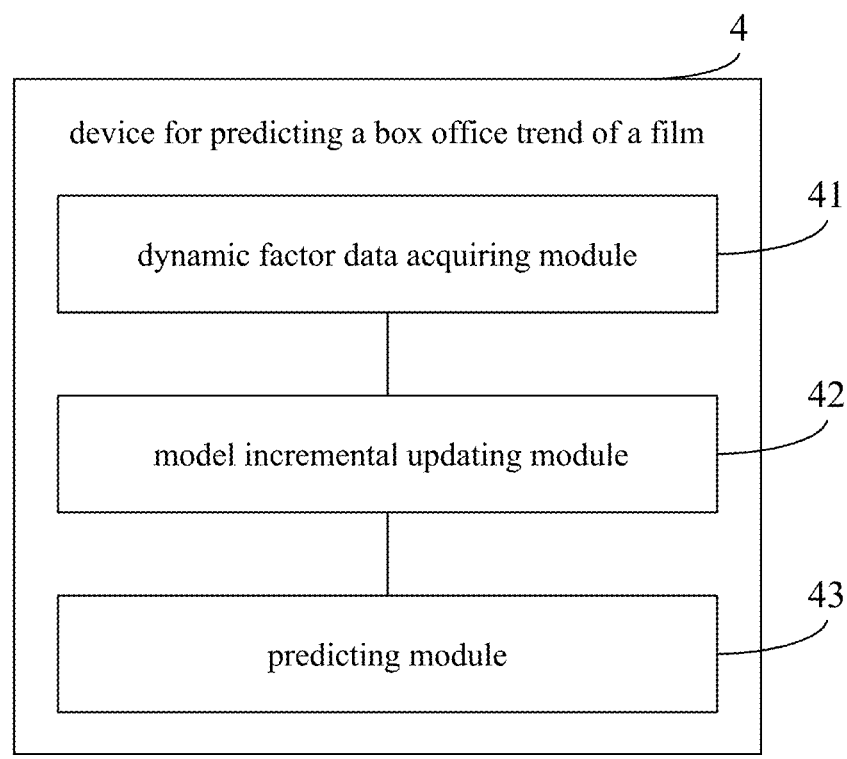
FIG. 4 is a block diagram of a device for predicting a box office trend of a film according to a fourth embodiment of the present disclosure.

FIG. 4 is a block diagram of a device for predicting a box office trend of a film according to a fourth embodiment of the present disclosure. As illustrated in FIG. 4, the device 4 for predicting the box office trend of the film includes a dynamic factor data acquiring module 41, a model incremental updating module 42 and a predicting module 43.

The dynamic factor data acquiring module 41 is configured to acquire in real time a plurality of dynamic factor data of each of various films to be shown. The dynamic factor data represents a factor that influences box office of a film.

The model incremental updating module 42 is configured to, after a film in the various films is shown, incrementally update a pre-trained box office prediction model by using box office data and the plurality of dynamic factor data of the film.

The predicting module 43 is configured to, according to a preset period, predict a box office trend of a target film to be predicted in the various films by using a box office prediction model incrementally updated in each preset period and a plurality of dynamic factor data of the target film, to obtain a plurality of prediction results.

In embodiments of the present disclosure, with the dynamic factor data acquiring module and the model incremental updating module, the pre-trained box office prediction model is incrementally updated by using the box office data and the dynamic factor data acquired in real time, the accuracy of the model is improved, and then the box office trend of the target film is predicted through the predicting module by using the updated box office prediction model, such that a plurality of prediction results can be obtained. Instead of predicting the box office at one time, the prediction result is constantly modified according to the real-time updated model and the newly acquired data, such that the box office trend can be predicted a long while in advance, and the accuracy and value of the prediction result can also be improved.

Fifth Embodiment

Figure 5:
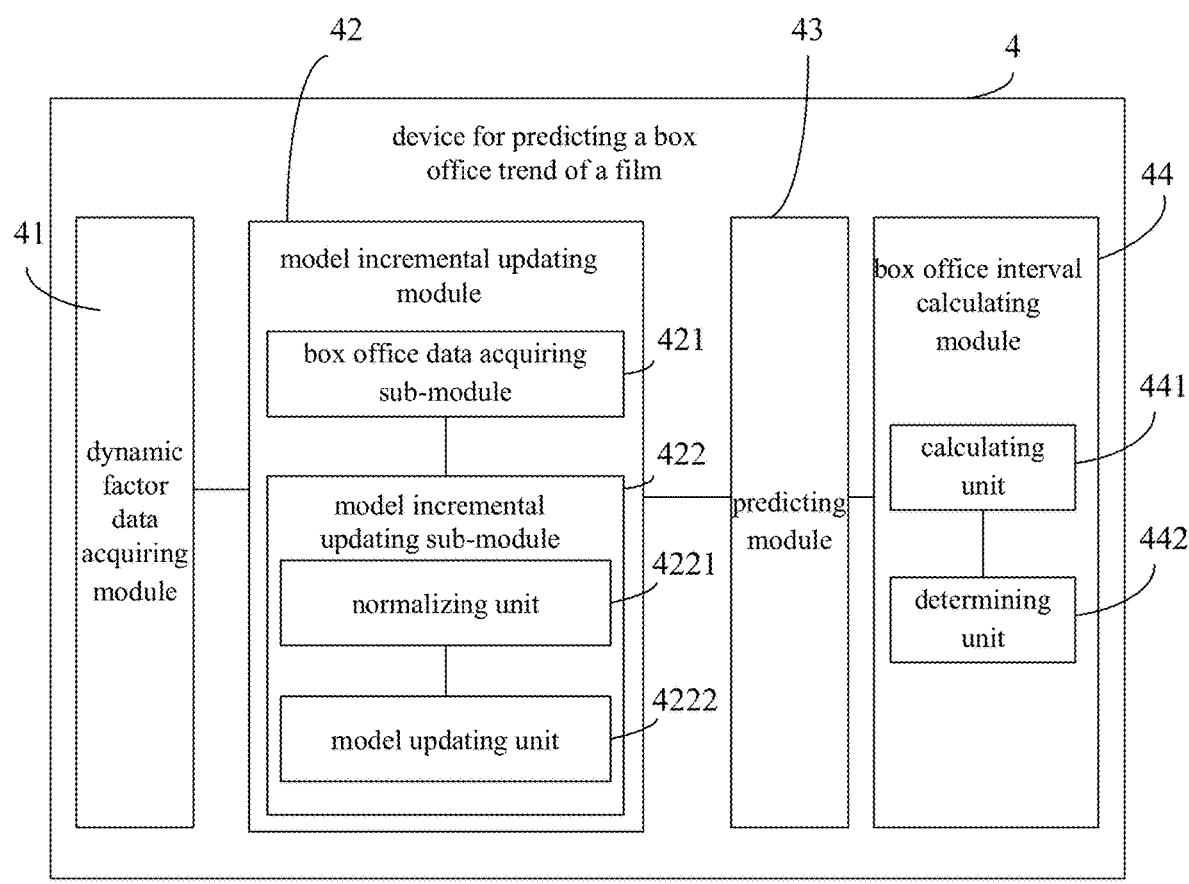
FIG. 5 is a block diagram of a device for predicting a box office trend of a film according to a fifth embodiment of the present disclosure.

FIG. 5 is a block diagram of a device for predicting a box office trend of a film according to a fifth embodiment of the present disclosure.

The fifth embodiment is further optimized on the basis of the fourth embodiment, and the same module is denoted by the same reference numeral as the fourth embodiment, which will not be described herein again.

As illustrated in FIG. 5, the model incremental updating module 42 further includes a box office data acquiring sub-module 421 and a model incremental updating sub-module 422.

The box office data acquiring sub-module 421 is configured to acquire in real time the box office data of the film.

The model incremental updating sub-module 422 is configured to train the pre-trained box office prediction model by taking the box office data and the plurality of dynamic factor data of the film as new model training data, to obtain an updated box office prediction model.

The model incremental updating sub-module 422 is further configured to, whenever a further film in the various films is shown, retrain the updated box office prediction model by using box office data and the plurality of dynamic factor data of the further film, to obtain the box office prediction model incrementally updated.

In addition, the model incremental updating sub-module 422 includes a normalizing unit 4221 and a model updating unit 4222.

The normalizing unit 4221 is configured to normalize each same kind of dynamic factor data of the various films, to calculate a plurality of normalized dynamic factor data of the film.

The model updating unit 4222 is configured to train the pre-trained box office prediction model by taking the box office data and the plurality of normalized dynamic factor data of the film as the new model training data, to obtain the updated box office prediction model.

In addition, the normalizing unit 4221 is configured to calculate an average value and a first standard deviation of a same kind of dynamic factor data of the various films; and divide the same kind of dynamic factor data of the film minus the average value by the first standard deviation, to obtain the same kind of normalized dynamic factor data of the film.

In addition, the device 4 further includes a box office interval calculating module 44. The box office interval calculating module 44 is configured to obtain a predicted box office interval of the target film according to the plurality of prediction results.

The box office interval calculating module 44 includes a calculating unit 441 and a determining unit 442.

The calculating unit 441 is configured to calculate a second standard deviation of the plurality of prediction results, and calculate a product value of the second standard deviation and a preset confidence coefficient.

The determining unit 442 is configured to determine the predicted box office interval as a prediction result obtained in a preset period minus the product value to the prediction result obtained in the preset period plus the product value.

The device for predicting a box office trend of a film provided in embodiments of the present disclosure can perform the method for predicting a box office trend of a film provided in any embodiment of the present disclosure, and includes functional modules configured to perform the method and has beneficial effects.

Sixth Embodiment

Figure 6:
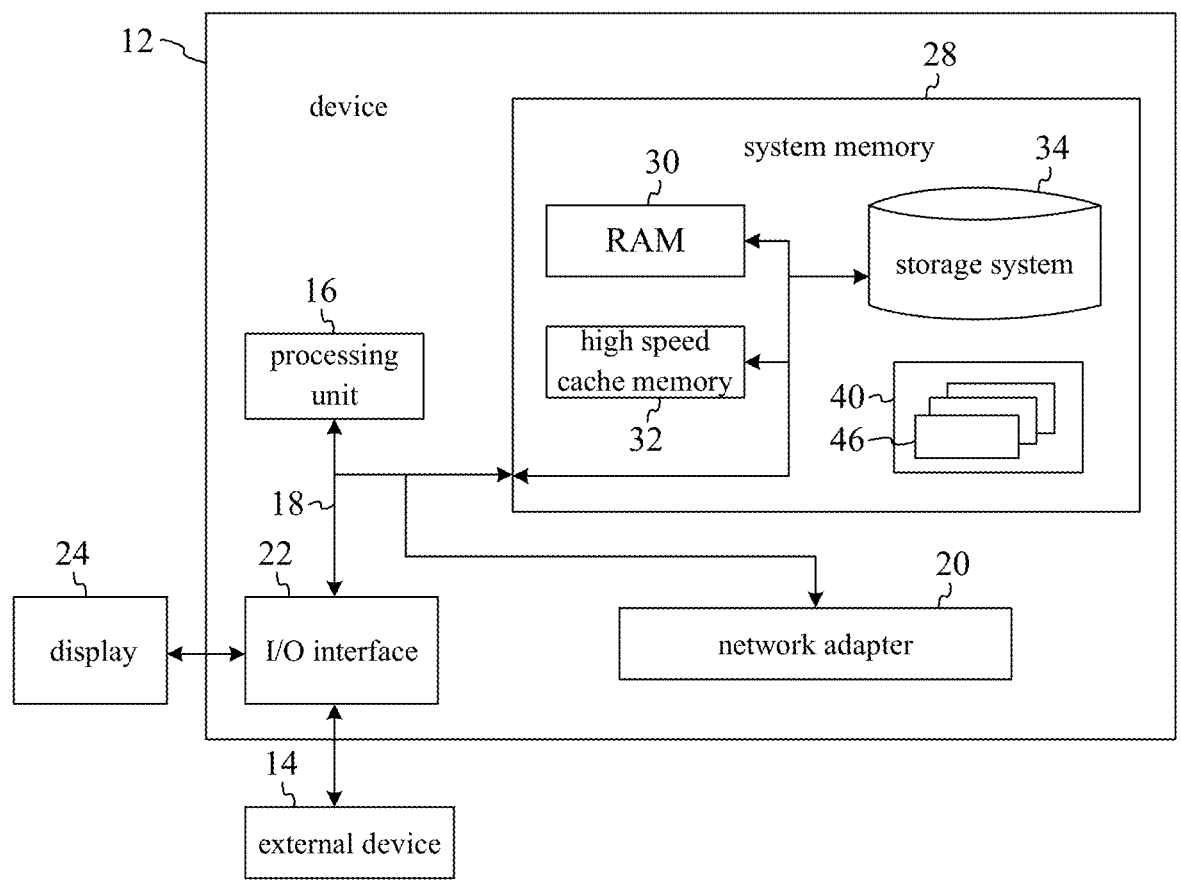
FIG. 6 is a schematic diagram of a device according to a sixth embodiment of the present disclosure.

FIG. 6 is a block diagram illustrating a device according to a sixth embodiment of the present disclosure. FIG. 6 illustrates a block diagram of an exemplary device 12 suitable for realizing implementations of the present disclosure. The device 12 illustrated in FIG. 6 is merely an example, which should be not understood to limit the functions and usage scope of embodiments of the present disclosure.

As illustrated in FIG. 6, the device 12 is in the form of a general-purpose computing apparatus. Components of the device 12 may include but be not limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 12 typically includes a variety of computer system readable media. These media may be any available media accessible by the device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The device 12 may further include other removable or non-removable, volatile or non-volatile computer system storage media. By way of example only, the storage system 34 may be configured to read and write a non-removable and non-volatile magnetic media (not illustrated in FIG. 6, commonly referred to as a "hard drive"). Although not illustrated in FIG. 6, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 46 may be stored in, for example, the memory 28. The program modules 46 include but are not limited to, an operating system, one or more application programs, other programs modules, and program data. Each of these examples, or some combination thereof, may include an implementation of a network environment. The program modules 46 generally perform the functions and/or methods in the embodiments described herein.

The device 12 may also communicate with one or more external devices 14 (such as, a keyboard, a pointing device, a display 24, etc.). Furthermore, the device 12 may also communicate with one or more communication devices enabling a user to interact with the device 12 and/or other devices (such as a network card, modem, etc.) enabling the device 12 to communicate with one or more devices. This communication can be performed via the input/output (I/O) interface 22. Also, the device 12 may communicate with one or more networks (such as a local area network (hereafter referred to as LAN), a wide area network (hereafter referred to as WAN) and/or a public network such as an Internet) through a network adapter 20. As illustrated in FIG. 6, the network adapter 20 communicates with other modules of the device 12 over the bus 18. It should be understood that, although not shown in FIG. 6, other hardware and/or software modules may be used in connection with the device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method for predicting a box office trend of a film provided in embodiments of the present disclosure. The method includes: acquiring in real time a plurality of dynamic factor data of each of various films to be shown, in which, the dynamic factor data represents a factor that influences box office of the film; after a film in the various films is shown, incrementally updating a pre-trained box office prediction model by using box office data and the plurality of dynamic factor data of the film; and according to a preset period, predicting a box office trend of a target film to be predicted in the various films by using a box office prediction model incrementally updated in each preset period and a plurality of dynamic factor data of the target film, to obtain a plurality of prediction results.

Seventh Embodiment

The seventh embodiment of the present disclosure provides a computer readable storage medium, configured to store computer programs. When the programs are executed by a processor, a method for predicting a box office trend of a film described above is implemented.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for predicting a box office trend of a film, comprising:

acquiring in real time a plurality of dynamic factor data of each of various films to be shown, wherein, the dynamic factor data represents a factor that influences box office of a film;

after a film in the various films is shown, incrementally updating a pre-trained box office prediction model by using box office data and the plurality of dynamic factor data of the film;

according to a preset period, predicting a box office trend of a target film to be predicted in the various films by using a box office prediction model incrementally updated in each preset period and the plurality of dynamic factor data of the target film, to obtain a plurality of prediction results; and obtaining a predicted box office interval of the target film according to the plurality of prediction results;

wherein obtaining the predicted box office interval of the target film according to the plurality of prediction results comprises:

calculating a second standard deviation of the plurality of prediction results, and calculating a product value of the second standard deviation and a preset confidence coefficient; and determining the predicted box office interval as a prediction result obtained in the preset period minus the product value to the prediction result obtained in the preset period plus the product value.

2. The method according to claim 1, wherein after a film in the various films is shown, incrementally updating the pre-trained box office prediction model by using the box office data and the plurality of dynamic factor data of the film comprises:

acquiring in real time the box office data of the film;

training the pre-trained box office prediction model by taking the box office data and the plurality of dynamic factor data of the film as new model training data, to obtain an updated box office prediction model; and whenever a further film in the various films is shown, retraining the updated box office prediction model by using box office data and the plurality of dynamic factor data of the further film, to obtain the box office prediction model incrementally updated.

3. The method according to claim 2, wherein training the pre-trained box office prediction model by taking the box office data and the plurality of dynamic factor data of the film as the new model training data, to obtain the updated box office prediction model comprises:

normalizing each same kind of dynamic factor data of the various films, to calculate a plurality of normalized dynamic factor data of the film; and training the pre-trained box office prediction model by taking the box office data and the plurality of normalized dynamic factor data of the film as the new model training data, to obtain the updated box office prediction model.

4. The method according to claim 3, wherein normalizing each same kind of dynamic factor data of the various films, to calculate the plurality of normalized dynamic factor data of the film comprises:

calculating an average value and a first standard deviation of a same kind of dynamic factor data of the various films; and dividing the same kind of dynamic factor data of the film minus the average value by the first standard deviation, to obtain the same kind of normalized dynamic factor data of the film.

5. A device for predicting a box office trend of a film, comprising:
   one or more processors; and
   a storage device, configured to store one or more programs;
   wherein when the one or more programs are executed by the one or more processors, the one or more processors are caused to implement a method for predicting a box office trend of a film, including:
      acquiring in real time a plurality of dynamic factor data of each of various films to be shown, wherein, the dynamic factor data represents a factor that influences box office of a film;
      after a film in the various films is shown, incrementally updating a pre-trained box office prediction model by using box office data and the plurality of dynamic factor data of the film;
      according to a preset period, predicting a box office trend of a target film to be predicted in the various films by using a box office prediction model incrementally updated in each preset period and the plurality of dynamic factor data of the target film, to obtain a plurality of prediction results; and
      obtaining a predicted box office interval of the target film according to the plurality of prediction results;
   wherein obtaining the predicted box office interval of the target film according to the plurality of prediction results comprises:
      calculating a second standard deviation of the plurality of prediction results, and calculating a product value of the second standard deviation and a preset confidence coefficient; and
      calculating the predicted box office interval as a prediction result obtained in the preset period minus the product value to the prediction result obtained in the preset period plus the product value.

6. The device according to claim 5, wherein after a film in the various films is shown, incrementally updating the pre-trained box office prediction model by using the box office data and the plurality of dynamic factor data of the film comprises:
   acquiring in real time the box office data of the film;
   training the pre-trained box office prediction model by taking the box office data and the plurality of dynamic factor data of the film as new model training data, to obtain an updated box office prediction model; and
   whenever a further film in the various films is shown, retraining the updated box office prediction model by using box office data and the plurality of dynamic factor data of the further film, to obtain the box office prediction model incrementally updated.

7. The device according to claim 6, wherein training the pre-trained box office prediction model by taking the box office data and the plurality of dynamic factor data of the film as the new model training data, to obtain the updated box office prediction model comprises:
   normalizing each same kind of dynamic factor data of the various films, to calculate a plurality of normalized dynamic factor data of the film; and
   training the pre-trained box office prediction model by taking the box office data and the plurality of normalized dynamic factor data of the film as the new model training data, to obtain the updated box office prediction model.

8. The device according to claim 7, wherein normalizing each same kind of dynamic factor data of the various films, to calculate the plurality of normalized dynamic factor data of the film comprises:
   calculating an average value and a first standard deviation of a same kind of dynamic factor data of the various films; and
   dividing the same kind of dynamic factor data of the film minus the average value the first standard deviation, to obtain the same kind of normalized dynamic factor data of the film.

9. A non-transitory computer readable storage medium, configured to store computer programs, wherein when the programs are executed by a processor, the processor is caused to implement a method for predicting a box office trend of a film, including:
   acquiring in real time a plurality of dynamic factor data of each of various films to be shown, wherein, the dynamic factor data represents a factor that influences box office of a film;
   after a film in the various films is shown, incrementally updating a pre-trained box office prediction model by using box office data and the plurality of dynamic factor data of the film;
   according to a preset period, predicting a box office trend of a target film to be predicted in the various films by using a box office prediction model incrementally updated in each preset period and the plurality of dynamic factor data of the target film, to obtain a plurality of prediction results; and
   obtaining a predicted box office interval of the target film according to the plurality of prediction results;
   wherein obtaining the predicted box office interval of the target film according to the plurality of prediction results comprises:
      calculating a second standard deviation of the plurality of prediction results, and calculating a product value of the second standard deviation and a preset confidence coefficient; and
      determining the predicted box office interval as a prediction result obtained in the preset period minus the product value to the prediction result obtained in the preset period plus the product value.

10. The non-transitory computer readable storage medium according to claim 9, wherein after a film in the various films is shown, incrementally updating the pre-trained box office prediction model by using the box office data and the plurality of dynamic factor data of the film comprises:
    acquiring in real time the box office data of the film;
    training the pre-trained box office prediction model by taking the box office data and the plurality of dynamic factor data of the film as new model training data, to obtain an updated box office prediction model; and
    whenever a further film in the various films is shown, retraining the updated box office prediction model by using box office data and the plurality of dynamic factor data of the further film, to obtain the box office prediction model incrementally updated.

11. The non-transitory computer readable storage medium according to claim 10, wherein training the pre-trained box office prediction model by taking the box office data and the plurality of dynamic factor data of the film as the new model training data, to obtain the updated box office prediction model comprises:
    normalizing each same kind of dynamic factor data of the various films, to calculate a plurality of normalized dynamic factor data of the film; and training the pre-trained box office prediction model by taking the box office data and the plurality of normalized dynamic factor data of the film as the new model training data, to obtain the updated box office prediction model.

12. The non-transitory computer readable storage medium according to claim 11, wherein normalizing each same kind of dynamic factor data of the various films, to calculate the plurality of normalized dynamic factor data of the film comprises:
   calculating an average value and a first standard deviation of a same kind of dynamic factor data of the various films; and
   dividing the same kind of dynamic factor data of the film minus the average value by the first standard deviation, to obtain the same kind of normalized dynamic factor data of the film.

* * * * *